(12) United States Patent
Wilson (10) Patent No.: US 9,280,753 B2
(45) Date of Patent: Mar. 8, 2016

(54) TRANSLATING A LANGUAGE IN A CROWDSOURCED ENVIRONMENT

(71) Applicant: International Business Machines Corporation, Armonk, NY (US)

(72) Inventor: Erica D. Wilson, Keller, TX (US)

(73) Assignee: International Business Machines Corporation, Armonk, NY (US)

( * ) Notice: Subject to any disclaimer, the term of this patent is extended or adjusted under 35 U.S.C. 154(b) by 382 days.

(21) Appl. No.: 13/859,182

(22) Filed: Apr. 9, 2013

(65) Prior Publication Data

US 2014/0303956 A1 Oct. 9, 2014

(51) Int. Cl.
*G06Q 10/06* (2012.01)
*G06F 17/28* (2006.01)

(52) U.S. Cl.
CPC .............. *G06Q 10/06* (2013.01); *G06F 17/289* (2013.01)

(58) Field of Classification Search
CPC ................................ G06F 17/28; G06F 17/289
See application file for complete search history.

(56) References Cited

U.S. PATENT DOCUMENTS

| | | | | |
|---|---|---|---|---|
| 5,528,491 | A * | 6/1996 | Kuno et al. | 704/9 |
| 5,640,537 | A * | 6/1997 | Jessen et al. | 703/23 |
| 5,797,011 | A * | 8/1998 | Kroll et al. | 717/137 |
| 5,978,560 | A * | 11/1999 | Tan et al. | 358/1.15 |
| 6,980,953 | B1 * | 12/2005 | Kanevsky et al. | 704/235 |
| 7,143,051 | B1 * | 11/2006 | Hanby et al. | 705/4 |
| 8,185,373 | B1 * | 5/2012 | Messenger | 704/2 |
| 8,448,072 | B1 * | 5/2013 | Lai et al. | 715/753 |
| 2002/0121181 | A1 * | 9/2002 | Fay et al. | 84/609 |
| 2002/0152063 | A1 * | 10/2002 | Tokieda et al. | 704/2 |
| 2003/0200486 | A1 * | 10/2003 | Marwaha | 714/39 |
| 2005/0010419 | A1 * | 1/2005 | Pourhamid | 704/277 |
| 2005/0086044 | A1 * | 4/2005 | Hess et al. | 704/2 |
| 2006/0259307 | A1 * | 11/2006 | Sanders et al. | 705/1 |
| 2008/0086764 | A1 * | 4/2008 | Kulkarni et al. | 726/7 |
| 2008/0183459 | A1 * | 7/2008 | Simonsen et al. | 704/1 |
| 2008/0195482 | A1 * | 8/2008 | Sailer | 705/14 |
| 2009/0119091 | A1 * | 5/2009 | Sarig | 704/2 |
| 2009/0204389 | A1 * | 8/2009 | Wang et al. | 704/7 |
| 2009/0265175 | A1 | 10/2009 | Fang | |

(Continued)

OTHER PUBLICATIONS

"Ackuna—Welcome to Ackuna App Translation!"; Copyright 2013 Ackuna; Printed Feb. 13, 2013; <http://ackuna.com>.
Pallis et al.; "Service-Oriented Computing—ICSOC 2011 Workshops"; ICSOC 2011 International Workshops; Dec. 5-8, 2011.
"Studies on translation and multilingualism"; Crowdsourcing translation: European Commission; May 2012.
"Real Time Translation Services"; IBM; Printed Feb. 13, 2013; <http://researcher.watson.ibm.com/researcher/view_project.php?id=1318>.
"Liquid Talent Marketplace"; IBM Liquid Portal—Sign in; Printed Feb. 13, 2013; <https://w3-03.ibm.com/transform/liquid/portal/login.html>.

(Continued)

*Primary Examiner* — Eric Yen
(74) *Attorney, Agent, or Firm* — Abdul-Samad A. Adediran; John R. Pivnichny (57) ABSTRACT

Program code on one or more computers receives a request from a first end-user to join a crowdsourced network of language translators (crowdsourced network). The program code determines the first end-user is a registered member of the crowdsourced network. The program code adds the first end-user as a language translator within the crowdsourced network. The program code receives from a second end-user a request for language translation service to translate plain text from the second end-user. The program code selects one of the language translators from the crowdsourced network who is qualified to perform the language translation service requested. The program code generates an interactive chat session to connect the language translator selected with the second end-user, wherein the language translator selected translates the plain text, via the interactive chat session that allows plain text to be translated at least more frequently than on an hourly basis.

12 Claims, 6 Drawing Sheets

(56) References Cited

U.S. PATENT DOCUMENTS

| | | | |
|---|---|---|---|
| 2011/0046944 A1* | 2/2011 | Sparks | 704/9 |
| 2011/0077935 A1* | 3/2011 | Viswanadha et al. | 704/7 |
| 2011/0145757 A1* | 6/2011 | Janwari | 715/786 |
| 2011/0185115 A1* | 7/2011 | Monti et al. | 711/103 |
| 2011/0282647 A1* | 11/2011 | Pastore | 704/4 |
| 2011/0307495 A1* | 12/2011 | Shoshan | 707/748 |
| 2012/0035906 A1 | 2/2012 | Jephcott | |
| 2012/0136646 A1* | 5/2012 | Kraenzel et al. | 704/2 |
| 2012/0141959 A1* | 6/2012 | von Ahn Arellano et al. | 434/157 |
| 2012/0316861 A1 | 12/2012 | Custer et al. | |
| 2014/0039870 A1* | 2/2014 | Roy et al. | 704/2 |
| 2014/0058718 A1* | 2/2014 | Kunchukuttan et al. | 704/2 |

OTHER PUBLICATIONS

Lin et al.; "Improving Service Processes with the Crowds"; ICSOC 2011; LNCS 7221; pp. 295-306; Copyright 2012 Springer-Verlag Berlin Heidelberg 2012.

"TopTen Reviews"; Translation Services Review 2013—Business Translation Services—Certified Translation Services; Printed Feb. 13, 2013; <http://translation-services-review.toptenreviews.com/>.

"Comparsion of machines translation applications"; Wikipedia; Printed Feb. 13, 2013; <http://en.wikipedia.org/wiki/Comparsion_of_machine-translation_applications>.

\* cited by examiner

TRANSLATING A LANGUAGE IN A CROWDSOURCED ENVIRONMENT

BACKGROUND

1. Field of the Invention

The present invention relates generally to language translation services, and more particularly to a language translation service for generating real-time human-based translation of plain text in a crowdsourced environment.

2. Description of the Related Art

Instant messaging is widely used for interactive communication between two or more persons over the Internet. For example, millions of Internet users are utilizing interactive software applications such as instant messaging services to communicate with co-works, friends, family, and even to exchange electronic images or other electronic documents (e.g., a text file or spreadsheet). Moreover, several organizations and businesses are integrating instant messaging software applications into their e-mail client software to encourage employee collaboration, and to minimize the cost of maintain and upgrading telecommunication services (e.g., telephone and video conferencing). As communication between people over the Internet increases around the world, the number of different types of interactive software applications is also increasing. These increases can give rise to communication compatibility issues in regard to how the interactive applications integrate with translation services. Moreover, as communication increases between people over the Internet, international communication via interactive applications is becoming more common. As a result, end-users of an interactive application may encounter language barriers when trying to communicate with each other. For example, a large company may have a global workforce of employees that are end-users of an interactive application. The employees may speak different languages and live in different countries, but communicate frequently and exchange documents via the interactive application in order to complete a project. However, the employees may experience difficulty in completing the project due to language barriers, which can reduce their productivity.

In an attempt to address the language barriers, it is known to use machine-based translation services to translate plain text from one language to a different language. However, current machine-based translation services can have very low accuracy, because programming a computer to determine context of words that are spoken or written can be challenging. In addition, to address the language barriers there exists various human-based language translation services to translate plain text from one language to a different language. Human-based language translation services can provide a higher degree of accuracy than machine-based translation, but many human-based language translation services are manual and not real-time, so may not integrate well with various interactive applications.

SUMMARY

Aspects of an embodiment of the present invention disclose a method, computer system, and program product for generating real-time human-based translation of plain text in a crowdsourced environment. One or more computers receive a request from a first end-user to join a crowdsourced network of language translators, wherein each one of the language translators is associated to a profile within a repository. At least one of the one or more computers determines the first end-user is a registered member of the crowdsourced network of language translators. Upon the at least one of the one or more computers determining that the first end-user is a registered member of the crowdsourced network, at least one of the one or more computers adds the first end-user as a language translator within the crowdsourced network of language translators. At least one of the one or more computers receive from a second end-user, via an electronic form with fields, a request for language translation service to translate plain text from the second end-user, wherein the request includes attached metadata with parameters for performing the language translation service. At least one of the one or more computers select one of the language translators from the crowdsourced network of language translators who is qualified to perform the language translation service requested. At least one of the one or more computers generates an interactive chat session to connect the language translator selected with the second end-user, wherein the language translator selected translates the plain text, via the interactive chat session that allows plain text from the second end-user to be translated by the first end-user at least more frequently than on an hourly basis.

BRIEF DESCRIPTION OF THE SEVERAL VIEWS OF THE DRAWINGS

The subject matter which is regarded as an embodiment of the present invention is particularly pointed out and distinctly claimed in the claims at the conclusion of the specification. One manner in which recited features of an embodiment of the present invention can be understood is by reference to the following detailed description of embodiments, taken in conjunction with the accompanying drawings in which:

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as JAVA, Smalltalk, C++ or the like, conventional procedural programming languages such as the "C" programming language, a hardware description language such as VERILOG, or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Exemplary embodiments now will be described more fully herein with reference to the accompanying drawings. This disclosure may, however, be embodied in many different forms and should not be construed as limited to the exemplary embodiments set forth herein. Rather, these exemplary embodiments are provided so that this disclosure will be thorough and complete, and will fully convey the scope of this disclosure to those skilled in the art. In the description, details of well-known features and techniques may be omitted to avoid unnecessarily obscuring the presented embodiments.

Embodiments of the present invention provide a language translation management program module for generating real-time human-based translation of plain text in a crowdsourced environment.

Figure 1:
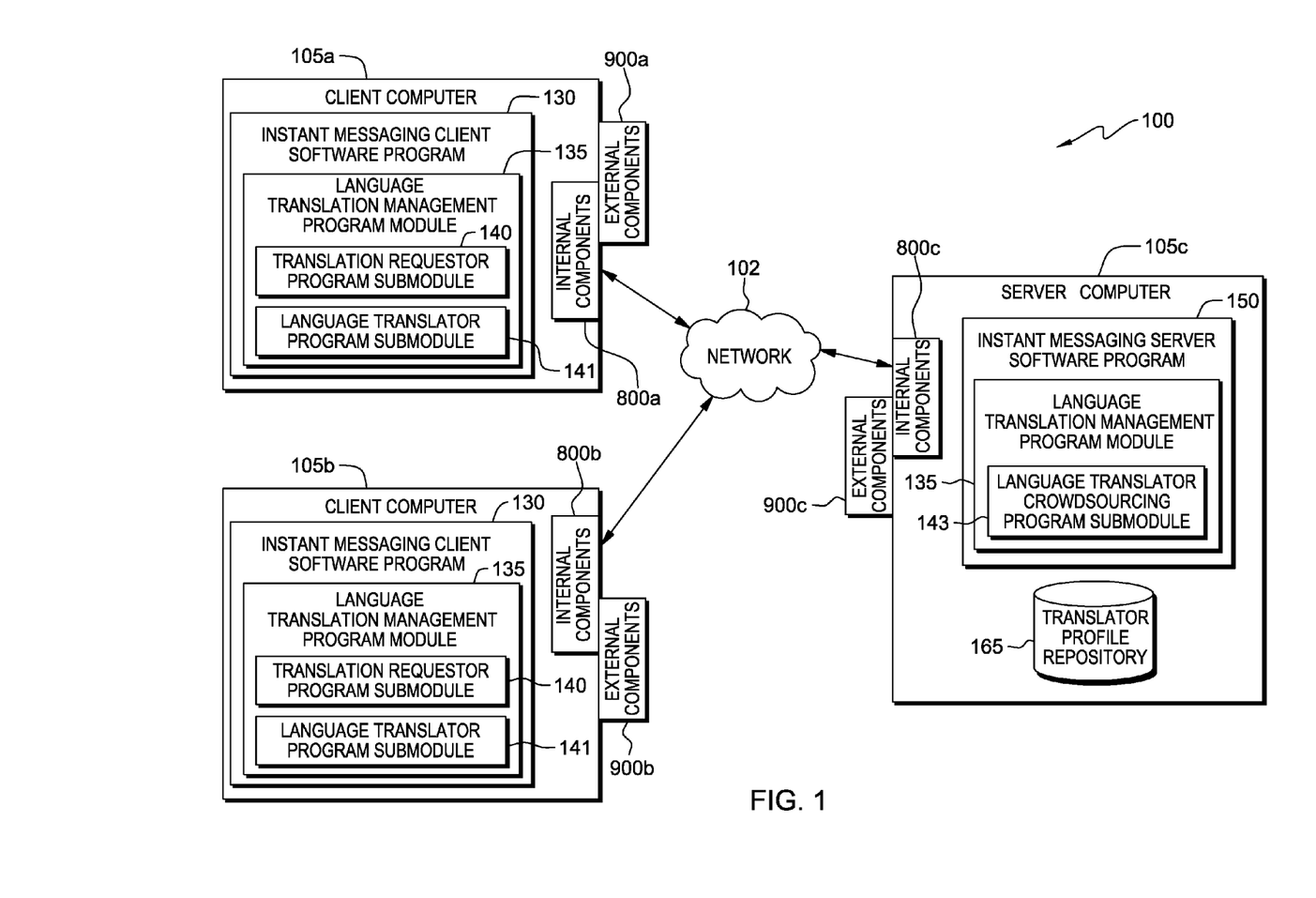
FIG. 1 is a block diagram of a distributed computer system, including a server computer and client computers each having instant messaging client software program with a language translation program module installed, wherein the language translation program module is program code that allows an end-user to request and receive translations services via the instant messaging client software program according to an embodiment of the present invention.

FIG. 1 illustrates computer system 100 that includes client computers 105a and 105b, network 102, and server computer 105c. Client computers 105a and 105b and server computer 105c can interact and exchange data (i.e., communicate) with each other via network 102. Client computers 105a-105b and server computer 105c each include respective internal components 800a-800b and 800c, and respective external components 900a and 900b and 900c, as described below in more detail with respect to FIG. 3. Client computers 105a and 105b are each installed with instant messaging client software program 130 having language translation management program module 135 with translation requestor program submodule 140 and language translator program submodule 141. Server computer 105c is installed with instant messaging server software program 150 having language translation management program module 135 with language translator crowdsourcing program submodule 143. In addition, server computer 105c includes translator profile repository 165.

Instant messaging client software program 130 allows end-users to interact with each other over the Internet. Specifically, instant messaging client software program 130 enables an end-user on a computer (e.g., client computer 105a) to exchange electronic messages over the Internet with another end-user on a different computer (e.g., client computer 105b). The electronic messages that are exchanged can include strings of text (i.e., plain text), an attached file, and even voice.

Translation requestor program submodule 140 is program code, of language translation management program module 135, that enables an end-user who is a requestor of language translation to submit a request for human-based language translation service (language translation service). The end-user who is the requestor can submit the request via instant messaging client software program 130. Moreover, language translator crowdsourcing program submodule 143 is program code, of language translation management module 135, that enables an end-user who is a language translator to receive the request for language translation service, and to send translations, via instant messaging client software program 130, to the requestor in response to the request. Furthermore, language translator crowdsourcing program submodule 143 is program code, of language translation management program module 135, that processes the request for language translation service, establishes a connectivity through network 102 between the requestor and a crowdsourced network of language translators in response to the request, broadcasts the request, and assigns at least one of the language translators to respond to the request. Translator profile repository 165 stores profiles of each end-user who is a language translator and registered member of the crowdsourced network of language translators, wherein the profiles can include at least the following properties: languages spoken and written by the translator, a performance rating of the translator, years of experience as a translator, and whether the translator is a certified translator.

FIGS. 2A-2D are flowcharts illustrating the steps of the program code, language translation management program module 135, for accessing a human-based language translation service for real-time translation of plain text from one language to another language, in a crowdsourced environment. Program modules of the program code are installed on client computers 105a and 105b, and server computer 105c as shown in FIG. 1.

Figure 2A:
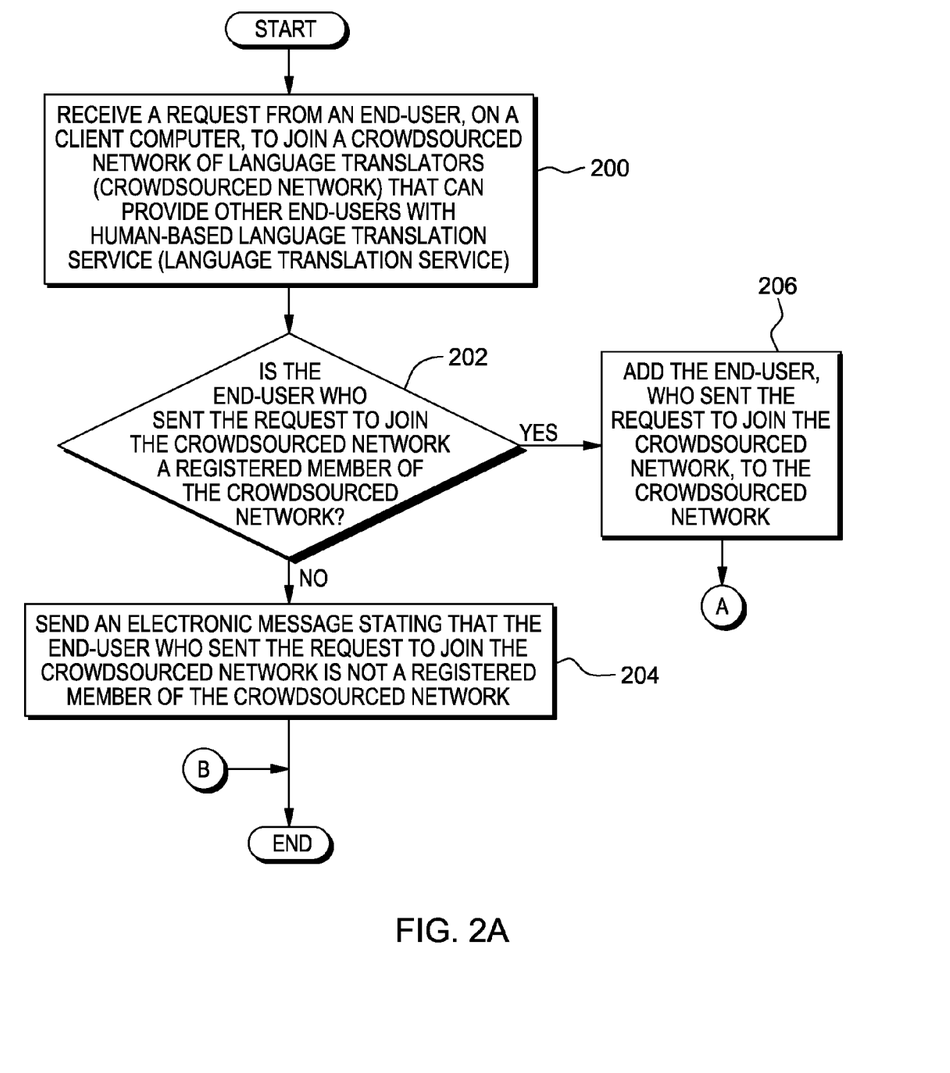
FIGS. 2A-2D are flowcharts illustrating operations of the program code according to an embodiment of the present invention.

FIG. 2A illustrates the steps of the program code adding a language translator to a crowdsourced network of language translators. In the disclosed embodiment, the program code receives a request from an end-user, on client computer 105b, to join a crowdsourced network of language translators (crowdsourced network) that can provide other end-users with human-based language translation service (language translation service) (block 200). Specifically, the crowdsourced network is a pool of end-users who are translators. Moreover, real-time refers to timeliness of the language translation services, wherein an end-user who is a registered member of the crowdsourced network can interactively provide translation of plain text for other end-users when needed. The timeliness is defined based on end-user requirements, wherein the transmission of translations of plain text in response to a request for language translation service occurs at least more frequently than on an hourly basis.

In response to receiving the request, the program code determines whether the end-user who sent the request to join the crowdsourced network is a registered member of the crowdsourced network (decision block 202). Specifically, to determine whether the end-user who sent the request to join the crowdsourced network is a registered member of the crowdsourced network, the program code of language translator crowdsourcing program submodule 143 checks for a profile of the end-user, within translator profile repository 165, wherein the profile can have registration information. A system programmer/administrator can configure a profile of an end-user, in translator profile repository 165, to include registration information. The registration information can include the following information: a unique identifier associated to the translator (e.g., translator's e-mail address), name, and membership activation date. Thus, if an end-user does not have a profile with registration information in translator profile repository 165, then the end-user is not a registered member of the crowdsourced network.

If the program code determines that the end-user who sent the request to join the crowdsourced network is not a registered member of the crowdsourced network (the "NO" branch of decision block 202), then the program code, of language translator crowdsourcing program submodule 143, sends an electronic message stating that the end-user who sent the request to join the crowdsourced network is not a registered member of the crowdsourced network (block 204). Subsequent to sending the electronic message the program code ends.

Otherwise, if the program code determines from the registration information that the end-user who sent the request to join the crowdsourced network is a registered member of the crowdsourced network (the "YES" branch of decision block 202), then the program code, of language translator crowdsourcing program submodule 143, adds the end-user, who sent the request to join the crowdsourced network, to the crowdsourced network (block 206). An end-user who is a registered member of the crowdsourced network and remains added to the crowdsourced network is available to provide language translation service to other end-users when needed. Registered members of the crowdsourced network who are not currently added to the crowdsourced network are unavailable to provide language translation service to other end-users. For example, a registered member of the crowdsourced network may be on vacation, and therefore is unavailable to provide language translation service to other end-users. However, registered members of the crowdsourced network can always request to join the crowdsourced network once they have availability. Next, the program code determines whether a request having attached metadata with parameters for language translation service is received, via an electronic form with fields, from an other end-user (requestor) (decision block 208).

Figure 2B:
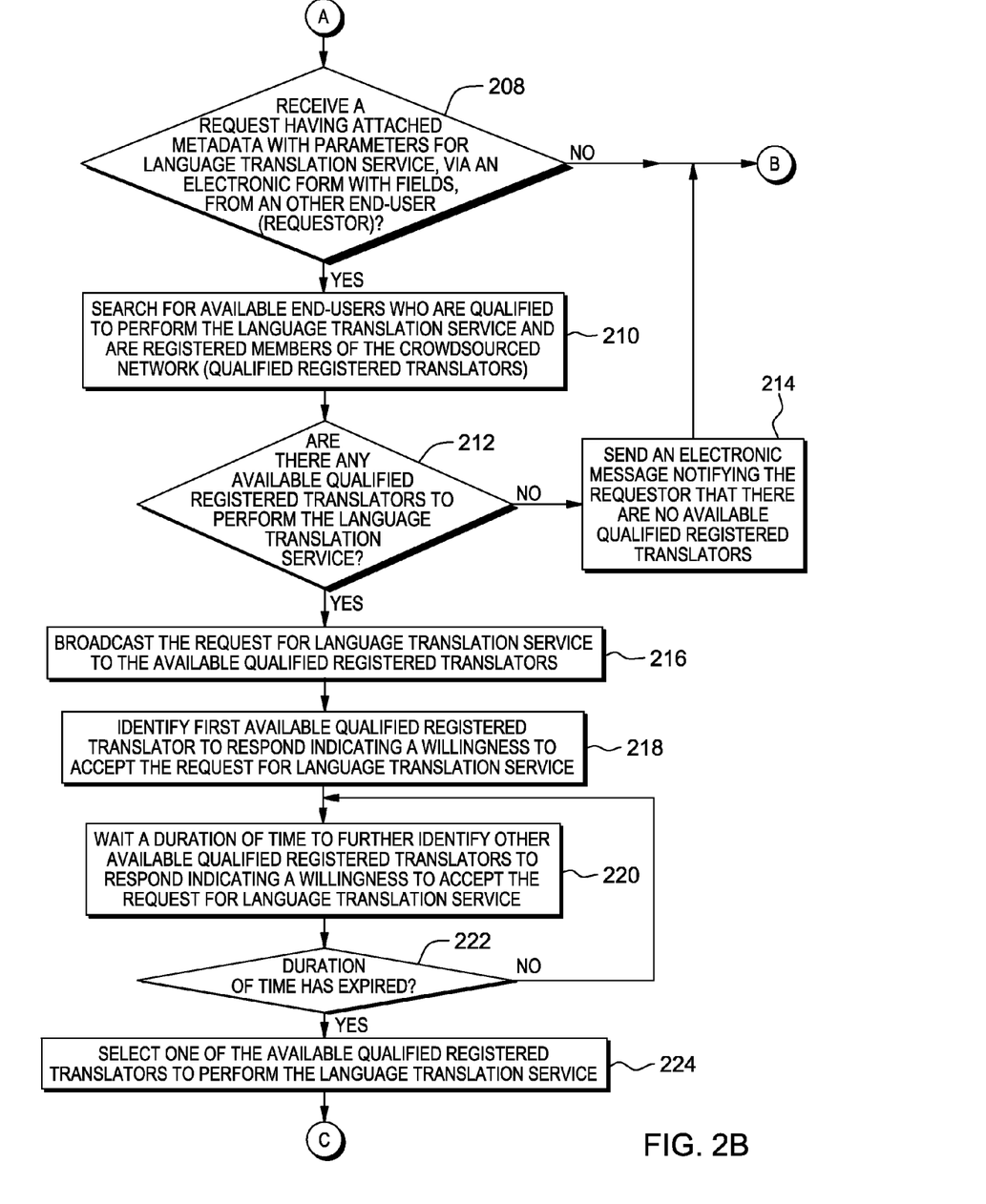

FIG. 2B illustrates the steps of the program code selecting, for the requestor, an end-user who is qualified to perform the language translation service and is a registered member of the crowdsourced network. Particularly, the request for human-based language translation service can be sent via an electronic form having the following fields: a boolean field for specifying activation of interactive mode functionality in which language translation service is provided interactively in real-time by an available end-user who is qualified to perform the language translation service and is a registered member of the crowdsourced network, a plain text field within which plain text to be translated is contained, a first language field for specifying the language of the plain text within the plain text field, a second language field for specifying the language to which the plain text within the plain text field is to be translated. Moreover, the program code attaches metadata to the request for human-based language translation service, wherein the metadata includes a parameter for each field within the electronic form that can be subsequently utilized by the program code for specifying how to handle the request. For example, the metadata includes a parameter for the boolean field specifying activation of interactive mode functionality of the program code, wherein the interactive mode functionality allows an end-user to obtain language translation service interactively in real-time from another end-user who is qualified to perform the language translation service and is a registered member of the crowdsourced network.

If the program code does not receive a request having attached metadata with parameters for language translation service, via an electronic form with fields, from an other end-user (the "NO" branch of decision block 208), then the program code ends. Otherwise, if the program code receives a request having attached metadata with parameters for language translation service, via an electronic form with fields, from an other end-user (the "YES" branch of decision block 208), then the program code searches for available end-users who are qualified to perform the language translation service and are registered members of the crowdsourced network (qualified registered translators) (block 210). Specifically, qualified registered translators are end-users that at least speak and write the languages needed to perform the language translation service requested.

If there are not any available qualified registered translators to perform the language translation service (the "NO" branch of decision block 212), then the program code sends an electronic message notifying the requestor that there are no available qualified registered translators (block 214). Subsequent to the notifying the requestor that there are no available qualified registered translators, the program code ends.

However, if there are any available qualified registered translators to perform the translation service (the "YES" branch of decision block 212), then program code broadcasts the request for language translation service to the available qualified registered translators (block 216). Next, the program code identifies first available qualified registered translator to respond indicating a willingness to accept the request for language translation service (block 218). Next, the program code waits a duration of time to further identify other available qualified registered translators to respond indicating a willingness to accept the request for language translation service (block 220). The duration of time is defined by a configurable hold time parameter. Thus, the hold time parameter can be configured to a specific duration of time, for example two minutes, based on end-user requirements.

If the duration of time has not yet expired (the "NO" branch of decision block 222), then the program code continues to wait the duration of time to further identify other available qualified registered translators to respond indicating a willingness to accept the request for language translation service (block 220). Otherwise, if the duration of time expires (the "YES" branch of decision block 222), then the program code selects one of the available qualified registered translators to perform the language translation service (block 224). Specifically, to select one of the available qualified registered translators to perform the language translation services the program code can search each profile, within translator profile repository 165, of the qualified registered translators, and select the available qualified registered translator with the highest performance rating of all the available qualified registered translators.

If more than one qualified registered translator has the highest performance rating, then the program code can be configured to give the requestor, an option to select which of the available qualified registered translators to perform the language translation services. Alternatively, if more than one qualified registered translator has the highest performance rating, then the program code can be configured to automatically select one of the available qualified registered translators having at least the most years of experience of all the available qualified register translators and/or certification as a language translator. Thus, the automatic selection of one of the available qualified translators is based on at least one of additional criteria, defined in the profiles of the available qualified registered translators, that include years of experience as a translator and/or whether the translator is a certified translator. Subsequently, the program code determines whether the language translation service is to be provided interactively in real-time by the available qualified translator selected (decision block 226).

Figure 2C:
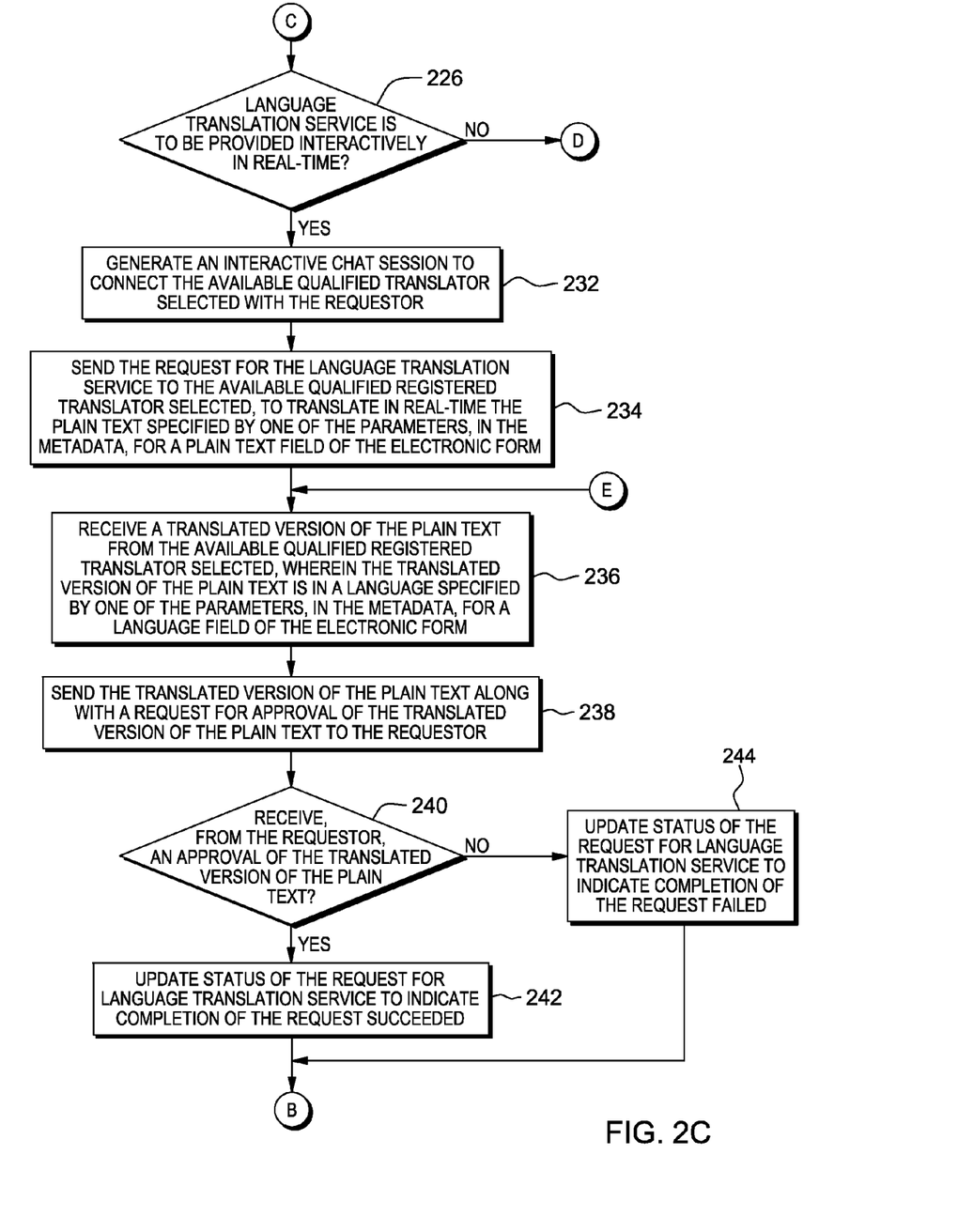
Figure 2D:
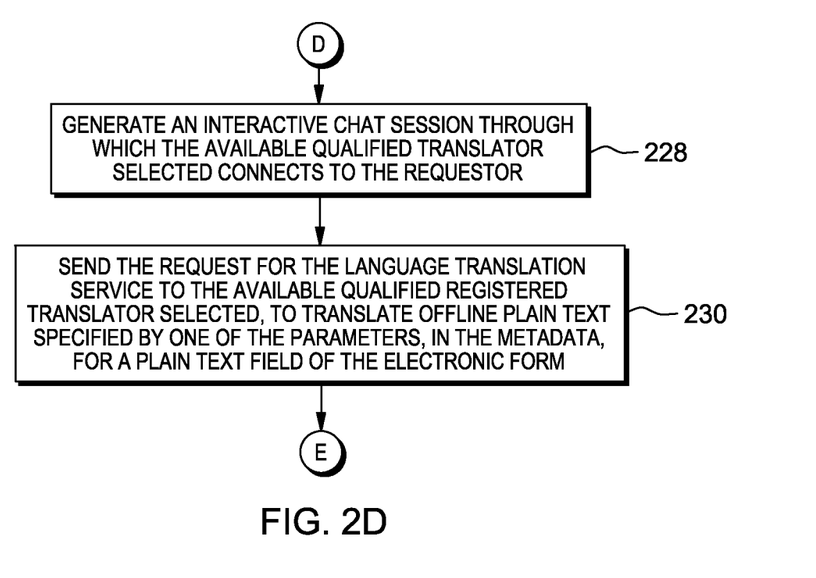

FIGS. 2C and 2D illustrate the steps of the program code generating an interactive chat session through which a requestor can connect to and communicate with the available qualified translator selected assigned to perform the language translation service requested. Next, if the program code determines the language translation service is not to be provided interactively in real-time (the "NO" branch of decision block 226), then program code generates an interactive chat session through which the available qualified translator selected connects to the requestor (block 228). Next, the program code sends the request for language translation service to the available qualified registered translator selected, to translate offline plain text specified by one of the parameters, in the metadata, for a plain text field of the electronic form (230). A request for language translation service that is being completed offline can also be referred to as being completed in project mode, wherein the amount of time to complete the request can take one or more days. Moreover, during project mode the interactive chat session between the available qualified translator selected and the requestor can remain open until the available qualified translator selected has finished working on the request for language translation service, which can allow the available qualified translator to collect information from the requestor that may be needed to complete the request. For example, the available qualified translator can collect requirements via a file attachment on an electronic form template sent through the interactive chat session. Subsequently, the program code receives a translated version of the plain text from the available qualified registered translator selected, wherein the translated version of the plain text is in a language specified by one of the parameters, in the metadata, for a language field of the electronic form (block 236).

Otherwise, if the program code determines the language translation service is to be provided interactively in real-time (the "YES" branch of decision block 226), then the program code generates an interactive chat session to connect the available qualified translator selected with the requestor (block 232). Specifically, to determine if the language translation service is to be provided interactively in real-time the program code checks the parameter for the boolean field specifying activation of interactive mode functionality is set to a binary value recognized by the program code as requiring the language translation services be provided in interactive mode. As mentioned above, the parameter for the boolean field specifying activation of interactive mode functionality is within the metadata attached to the request for language translation service.

Subsequent to generating the interactive chat session, the program code sends the request for the language translation service to the available qualified registered translator selected, to translate in real-time plain text specified by one of the parameters, in the metadata, for a plain text field of the electronic form (block 234). Particularly, the request for the language translation service can be sent via the interactive chat session. Moreover, the plain text field of the electronic form contains plain text entered by the requestor to be translated by the available qualified registered translator selected. Next, the program code receives in real-time a translated version of the plain text from the available qualified registered translator selected, wherein the translated version of the plain text is in a language specified by one of the parameters, in the metadata, for a language field of the electronic form (block 236). The program code sends the translated version of the plain text along with a request for approval of the translated version of the plain text to the requestor (block 238). If the program code receives, from the requestor, an approval of the translated version of the plain text (the "YES" branch of decision block 240), then the program code updates status of the request for language translation service to indicate completion of the request succeeded (block 242). Subsequent to updating the status the program code ends. Otherwise, if the program code does not receive, from the requestor, an approval of the translated version of the plain text (the "NO"

branch of decision block 240), then updates status of the request for language translation service to indicate completion of the request failed (block 244). Subsequent to updating the status the program code ends.

Figure 3:
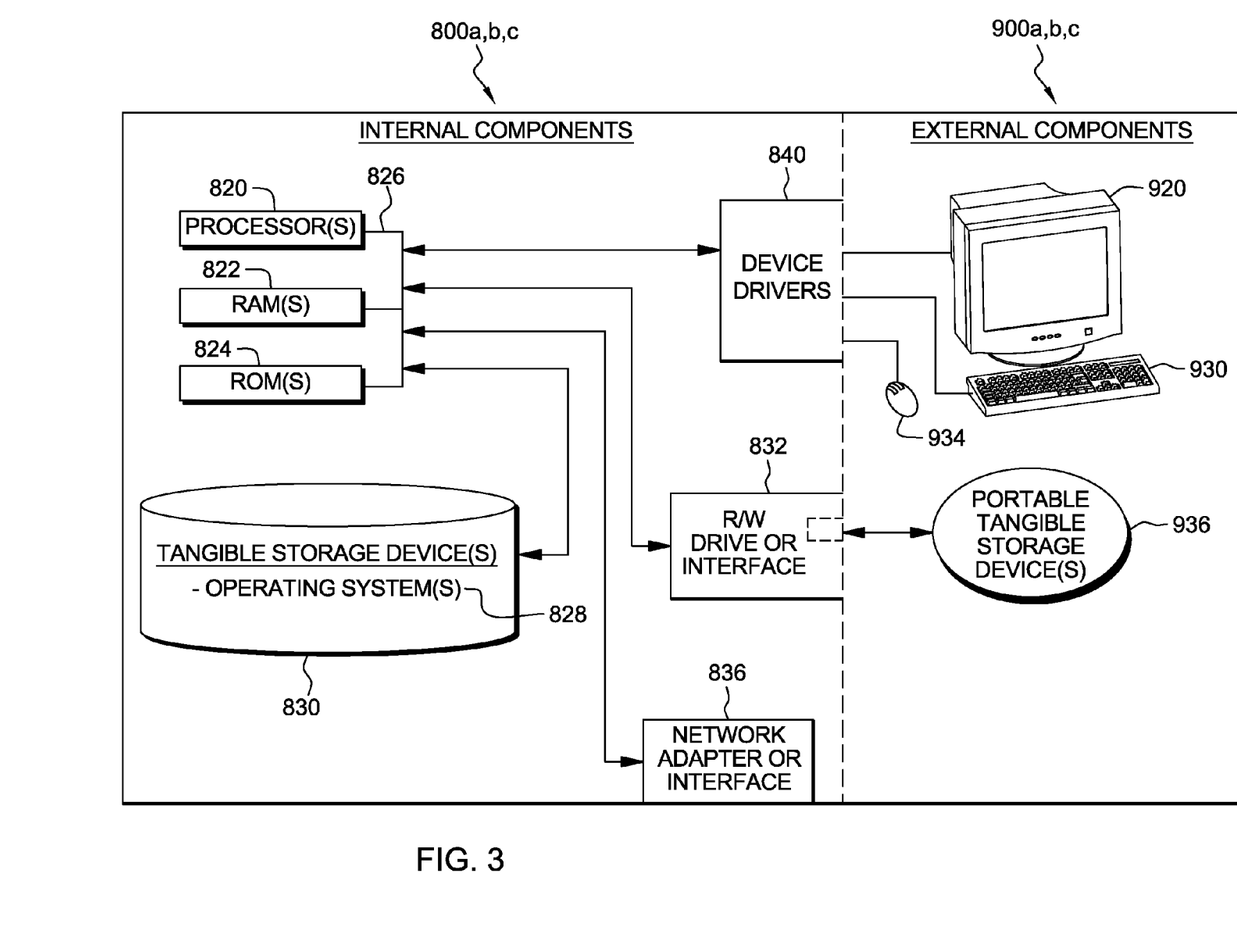
FIG. 3 is a block diagram depicting internal and external components of the client computers and the server computers of FIG. 1 according to an embodiment of the present invention.

FIG. 3 is a block diagram depicting a set of internal components 800a and 800b and a set of external components 900a and 900b that correspond to respective client computer 105a and 105b, as well as a set of internal components 800c and a set of external components 900c that correspond to server computer 105c. Internal components 800a-800c each include one or more processors 820, one or more computer readable RAMs 822 and one or more computer readable ROMs 824 on one or more buses 826, and one or more operating systems 828 and one or more computer readable tangible storage devices 830. The one or more operating systems 828 and language translation management program module 135 on client computers 105a and 105b, and server computer 105c are stored on one or more of the respective computer readable tangible storage devices 830 for execution by one or more of the respective processors 820 via one or more of the respective RAMs 822 (which typically include cache memory). In the embodiment illustrated in FIG. 3, each of the computer readable tangible storage devices 830 is a magnetic disk storage device of an internal hard drive. Alternatively, each of the computer readable tangible storage devices 830 is a semiconductor storage device such as ROM 824, EPROM, flash memory or any other computer readable tangible storage device that can store a computer program and digital information.

Each set of internal components 800a-800c includes a R/W drive or interface 832 to read from and write to one or more portable computer readable tangible storage devices 936 such as CD-ROM, DVD, memory stick, magnetic tape, magnetic disk, optical disk or semiconductor storage device. Language translation management program module 135 on client computers 105a and 105b, and server computer 105c can be stored on one or more of the respective portable computer readable tangible storage devices 936, read via the respective R/W drive or interface 832 and loaded into the respective hard drive or computer readable tangible storage device 830.

Furthermore, each set of internal components 800a-800c also includes a network adapter or interface 836 such as TCP/IP adapter card, wireless wi-fi interface card, or 3G or 4G wireless interface card or other wired or wireless communication link. Language translation management program module 135 can be downloaded to client computers 105a and 105b, and server computer 105c from an external computer or external storage device via a network (for example, the Internet, a LAN, or a WAN) and respective network adapters or interfaces 836. From the network adapter or interface 836, language translation management program module 135 on client computers 105a and 105b, and server computer 105c are loaded into at least one respective hard drive or computer readable tangible storage device 830. The network may comprise copper wires, optical fibers, wireless transmission, routers, firewalls, switches, gateway computers and/or servers.

Each set of external components 900a-900c can include a computer display monitor 920, a keyboard 930, and a computer mouse 934. External components 900a-900c can also include touch screens, virtual keyboards, touch pads, pointing devices, and other human interface devices. Each set of internal components 800a-800c also includes device drivers 840 to interface to computer display monitor 920, keyboard 930 and computer mouse 934. The device drivers 840, R/W drive or interface 832 and network adapter or interface 836 comprise hardware and software in which the software is stored in computer readable tangible storage device 830 and/or ROM 824.

It should be appreciated that FIG. 3 provides only an illustration of one implementation and does not imply any limitations with regard to the environments in which different embodiments may be implemented. A variety of modifications to the depicted environments may be implemented. Moreover, a variety of modifications to the depicted environments may be made based on design and implementation requirements.

In accordance with the foregoing, a method, a computer system, and a computer program product have been disclosed for generating real-time human-based translation of plain text in a crowdsourced environment. However, numerous modifications substitutions can be made without deviating from the scope of an embodiment of the invention. Therefore, one or more embodiments of the invention have been disclosed by way of example and not limitation.

What is claimed is:

1. A method for generating real-time human-based translation of plain text in a crowdsourced environment, the method comprising:
creating a crowdsourced network of registered language translators, with each registered language translator having a respectively associated profile in a machine readable repository of profiles;
receiving, from an end-user of the crowdsourced network a request to translate a natural language text, wherein the request includes translator qualification parameter information relating to desired qualifications of a translator to perform the translation;
selecting, by machine logic and based, at least in part, upon the profiles of the respectively associated registered language translators, one of the registered language translators from the crowdsourced network as a selected translator for performing the requested translation;
generating, by machine logic, an interactive chat session to connect the selected translator with the end-user;
receiving, through the interactive chat session and from the end-user, an indication that the requested translation has been approved; and
responsive to the receipt of the approval, updating, by machine logic, status information to indicate that the request to translate has been completed.

2. The method of claim 1, further comprising:
communicating, through the interactive chat session and to the selected translator, the natural language text in one of the following forms: as voice data, or as a word processor format file.

3. The method of claim 1, wherein each profile includes information, for the respectively associated registered language translator, relating to all of the following translator qualification properties: one or more languages spoken and written by the one of the language translators that is associated to the profile, a performance rating of the one of the language translators that is associated to the profile, years of experience of the one of the language translators that is associated to the profile, and whether the one of the language translators that is associated to the profile is a certified translator.

4. The method of claim 1, wherein the selection of one of the selected translator comprises:
determining a most-suited language translator based, at least in part, on the profiles of the registered language translators qualification properties and the translator qualification parameter information; and selecting the most-suited translator to perform the language translation service requested.

5. A computer program product for generating real-time human-based translation of plain text in a crowdsourced environment, the computer program product comprising:
   a non-transitory computer readable storage medium and program instructions stored on the non-transitory computer readable storage medium, the program instructions comprising:
   first program instructions programmed to create a crowdsourced network of registered language translators, with each registered language translator having a respectively associated profile in a machine readable repository of profiles;
   second program instructions programmed to receive, from an end-user of the crowdsourced network a request to translate a natural language text, wherein the request includes translator qualification parameter information relating to desired qualifications of a translator to perform the translation;
   third program instructions programmed to select, by machine logic and based, at least in part, upon the profiles of the respectively associated registered language translators, one of the registered language translators from the crowdsourced network as a selected translator for performing the requested translation;
   fourth program instructions programmed to generate, by machine logic, an interactive chat session to connect the selected translator with the end-user;
   fifth program instructions programmed to receive, through the interactive chat session and from the end-user, an indication that the requested translation has been approved; and
   sixth program instructions programmed to, responsive to the receipt of the approval, update, by machine logic, status information to indicate that the request to translate has been completed.

6. The computer program product of claim 5, wherein the medium has further stored thereon:
   seventh program instructions programmed to communicate, through the interactive chat session and to the selected translator, the natural language text in one of the following forms: as voice data, or as a word processor format file.

7. The computer program product of claim 5, wherein each profile includes information, for the respectively associated registered language translator, relating to all of the following translator qualification properties: one or more languages spoken and written by the one of the language translators that is associated to the profile, a performance rating of the one of the language translators that is associated to the profile, years of experience of the one of the language translators that is associated to the profile, and whether the one of the language translators that is associated to the profile is a certified translator.

8. The computer program product of claim 5, wherein the third program instructions are further programmed to select the selected translator comprising:
   seventh program instructions programmed to determine a most-suited language translator based, at least in part, on the profiles of the registered language translators qualification properties and the translator qualification parameter information; and
   eighth program instructions programmed to select the most-suited translator to perform the language translation service requested.

9. A computer system for generating real-time human-based translation of plain text in a crowdsourced environment, the computer system comprising:
   a non-transitory computer readable storage medium and program instructions stored on the non-transitory computer readable storage medium, the program instructions comprising:
   first program instructions programmed to create a crowdsourced network of registered language translators, with each registered language translator having a respectively associated profile in a machine readable repository of profiles,
   second program instructions programmed to receive, from an end-user of the crowdsourced network a request to translate a natural language text, wherein the request includes translator qualification parameter information relating to desired qualifications of a translator to perform the translation,
   third program instructions programmed to select, by machine logic and based, at least in part, upon the profiles of the respectively associated registered language translators, one of the registered language translators from the crowdsourced network as a selected translator for performing the requested translation,
   fourth program instructions programmed to generate, by machine logic, an interactive chat session to connect the selected translator with the end-user,
   fifth program instructions programmed to receive, through the interactive chat session and from the end-user, an indication that the requested translation has been approved, and
   sixth program instructions programmed to, responsive to the receipt of the approval, update, by machine logic, status information to indicate that the request to translate has been completed.

10. The computer system of claim 9, wherein the medium has further stored thereon:
    seventh program instructions programmed to communicate, through the interactive chat session and to the selected translator, the natural language text in one of the following forms: as voice data, or as a word processor format file.

11. The computer system of claim 9, wherein each profile includes information, for the respectively associated registered language translator, relating to all of the following translator qualification properties: one or more languages spoken and written by the one of the language translators that is associated to the profile, a performance rating of the one of the language translators that is associated to the profile, years of experience of the one of the language translators that is associated to the profile, and whether the one of the language translators that is associated to the profile is a certified translator.

12. The computer system of claim 9, wherein the third program instructions are further programmed to select the selected translator comprising:
    seventh program instructions programmed to determine a most-suited language translator based, at least in part, on the profiles of the registered language translators qualification properties and the translator qualification parameter information; and
    eighth program instructions programmed to select the most-suited translator to perform the language translation service requested.

* * * * *